United States Patent
Ishikawa et al.

(10) Patent No.: US 9,711,819 B2
(45) Date of Patent: Jul. 18, 2017

(54) MOUNT STRUCTURE FOR FUEL CELL STACK

(71) Applicants: HONDA MOTOR CO., LTD., Minato-Ku, Tokyo (JP); NISSIN KOGYO CO., LTD., Tomi, Nagano (JP)

(72) Inventors: Choichi Ishikawa, Wako (JP); Ryoichi Yoshitomi, Wako (JP); Hideharu Naito, Wako (JP); Susumu Yodono, Tomi (JP); Takashi Kuroiwa, Tomi (JP)

(73) Assignees: Honda Motor Co., Ltd., Tokyo (JP); Nissin Kogyo Co., Ltd., Nagano (JP)

( * ) Notice: Subject to any disclaimer, the term of this patent is extended or adjusted under 35 U.S.C. 154(b) by 0 days.

(21) Appl. No.: 15/296,746

(22) Filed: Oct. 18, 2016

(65) Prior Publication Data

US 2017/0117570 A1    Apr. 27, 2017

(30) Foreign Application Priority Data

Oct. 22, 2015   (JP) ................................ 2015-208424

(51) Int. Cl.
*H01M 8/2475*   (2016.01)
*B60L 11/18*   (2006.01)

(52) U.S. Cl.
CPC ....... *H01M 8/2475* (2013.01); *B60L 11/1896* (2013.01); *H01M 2250/20* (2013.01)

(58) Field of Classification Search
CPC .. B60L 11/1898; B60L 11/1896; B62D 21/11; B62D 21/15; B60K 1/04; B60K 1/00
See application file for complete search history.

(56) References Cited

U.S. PATENT DOCUMENTS

| | | | |
|---|---|---|---|
| 7,588,117 B2* | 9/2009 | Fukuda | B60K 1/00 180/291 |
| 9,045,172 B2* | 6/2015 | Gopal | B62D 21/11 |
| 9,079,508 B2* | 7/2015 | Naito | B60K 1/04 |
| 9,298,936 B2* | 3/2016 | Stuntebeck | G06F 21/62 |
| 2002/0189873 A1* | 12/2002 | Mizuno | B60K 1/04 180/65.31 |
| 2012/0015257 A1* | 1/2012 | Arisawa | B60K 1/04 429/400 |
| 2012/0021301 A1* | 1/2012 | Ohashi | B60K 1/04 429/400 |
| 2014/0367182 A1* | 12/2014 | Yoshinaga | B60L 11/1898 180/68.4 |

(Continued)

FOREIGN PATENT DOCUMENTS

JP    2007-317406 A    12/2007

*Primary Examiner* — Hau Phan
(74) *Attorney, Agent, or Firm* — Carrier Blackman & Associates, P.C.; Joseph P. Carrier; William D. Blackman

(57) ABSTRACT

A mount structure includes a mount member, and a bracket member. An upper surface of the bracket member, which is connected to a lower portion of a fuel cell stack, includes an upper surface cut formed by cutting the bracket member in a depth direction, and the upper surface cut extends in a surface direction. A lower surface of the bracket member, which is opposite to the upper surface, includes a lower surface cut formed by cutting the bracket member in the depth direction, and the lower surface cut extends in the surface direction.

6 Claims, 8 Drawing Sheets

(56) References Cited

U.S. PATENT DOCUMENTS

| | | | |
|---|---|---|---|
| 2015/0027796 A1* | 1/2015 | Naito | B60K 1/04 180/65.31 |
| 2015/0083507 A1* | 3/2015 | Keller | B60K 1/04 180/68.5 |
| 2015/0251560 A1* | 9/2015 | Ishikawa | B62D 21/15 180/232 |

* cited by examiner

MOUNT STRUCTURE FOR FUEL CELL STACK

CROSS-REFERENCE TO RELATED APPLICATION

This application is based upon and claims the benefit of priority from Japanese Patent Application No. 2015-208424 filed on Oct. 22, 2015, the contents of which are incorporated herein by reference.

BACKGROUND OF THE INVENTION

Field of the Invention

The present invention relates to a mount structure for a fuel cell stack, which is used to install the fuel cell stack in a fuel cell vehicle. The fuel cell stack is formed by stacking a plurality of power generation cells for generating electrical energy by electrochemical reactions between a fuel gas and an oxygen-containing gas.

Description of the Related Art

For example, in a solid polymer electrolyte fuel cell, an electrolyte membrane (polymer ion exchange membrane) is interposed between an anode and a cathode in order to form a membrane electrode assembly (MEA). The membrane electrode assembly is sandwiched between a pair of separators to thereby form a power generation cell (unit cell). When using the fuel cell, generally, a predetermined number of power generation cells are stacked together in order to form a fuel cell stack, e.g., which is mounted in a fuel cell vehicle (fuel cell electric vehicle, etc.).

Further, in an in-vehicle fuel cell stack, it is necessary to suitably protect the fuel cells against external loads such as vibrations or impacts that occur during traveling of the vehicle. For example, a fuel cell installation structure is known, as disclosed in Japanese Laid-Open Patent Publication No. 2007-317406. In particular, Japanese Laid-Open Patent Publication No. 2007-317406 relates to an installation structure in which a fuel cell stack, which comprises a plurality of stacked power generation cells, is supported at an installation position using a cushioning apparatus. The cushioning apparatus has a conversion function for converting the direction of an external force, in a direction that intersects with a stacking direction of the power generation cells of the fuel cell stack, into the stacking direction of the power generation cells.

Thus, according to this structure, when an external force is applied to the fuel cell stack in a direction perpendicular to the stacking direction of the power generation cells, the direction of the external force is converted into the stacking direction of the power generation cells, in which durability against the external force is relatively high. According to the disclosure, with such a structure, an improvement in vibration resistance and impact resistance can be achieved.

SUMMARY OF THE INVENTION

However, in the above cushioning apparatus, since a link mechanism is provided at the installation surface and between both ends of the fuel cell stack, the overall size of the installation structure is significantly large in the stacking direction of the fuel cell stack. Further, the structure is complicated and uneconomical.

The present invention has been made in order to solve problems of this type. An object of the present invention is to provide a mount structure for a fuel cell stack having a simple and economical structure, in which it is possible to suitably protect the fuel cell stack when an external load is applied to the fuel cell stack.

A mount structure for mounting a fuel cell stack according to the present invention includes a mount member and a bracket member. The fuel cell stack comprises a plurality of stacked power generation cells for generating electrical energy by electrochemical reactions between a fuel gas and an oxygen-containing gas. The fuel cell stack is provided in a motor room of a fuel cell vehicle. A motor is arranged below the fuel cell stack. The mount member is configured to fix the fuel cell stack and the motor to a vehicle body. The bracket member is configured to connect the mount member and the fuel cell stack.

Further, an upper surface of the bracket member, which is connected to a lower portion of the fuel cell stack, has an upper surface cut formed by cutting the bracket member in a depth direction, and the upper surface cut extends in a surface direction of the upper surface. Further, a lower surface of the bracket member opposite to the upper surface has a lower surface cut formed by cutting the bracket member in the depth direction, and the lower surface cut extends in a surface direction of the lower surface.

Further, preferably, in the mount structure, a length of the upper surface cut in the surface direction is shorter than a length of the lower surface cut in the surface direction.

Further, preferably, in the mount structure, a cut depth of the upper surface cut is smaller than a cut depth of the lower surface cut.

Moreover, preferably, the mount structure includes a plurality of bolts configured to fix the bracket member and the fuel cell stack. In this regard, preferably, among the bolts, a bolt positioned at a rearmost end in a vehicle traveling direction, the upper surface cut, and the lower surface cut are arranged on a same virtual straight line extending in a vehicle widthwise direction.

Further, preferably, the mount structure includes a stack case containing the fuel cell stack, and the bracket member is fixed to the mount member and a lower surface of the stack case.

In the present invention, the upper surface cut and the lower surface cut are provided in the bracket member that connects the mount member and the fuel cell stack. Therefore, when an external load is applied to the fuel cell vehicle, the bracket member is broken apart through the upper surface cut and the lower surface cut. Thus, it becomes possible to reliably prevent damage from occurring to the fuel cell stack.

Accordingly, with the simple and economical structure, it is possible to suitably protect the fuel cell stack against external loads.

The above and other objects, features and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
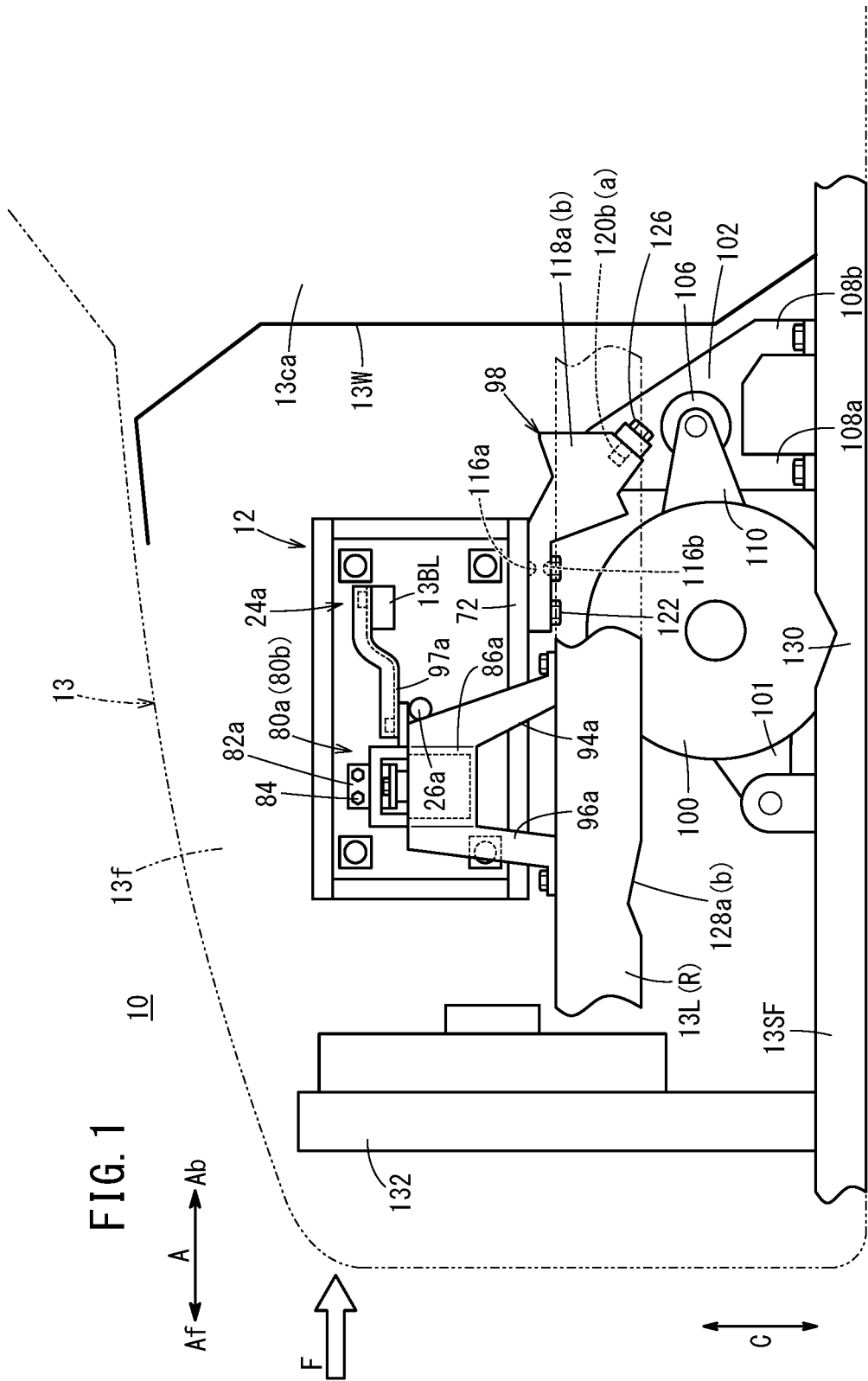
FIG. 1 is a side view schematically showing a front portion of a fuel cell electric vehicle equipped with a fuel cell stack to which a mount structure according to an embodiment of the present invention is applied.
Figure 2:
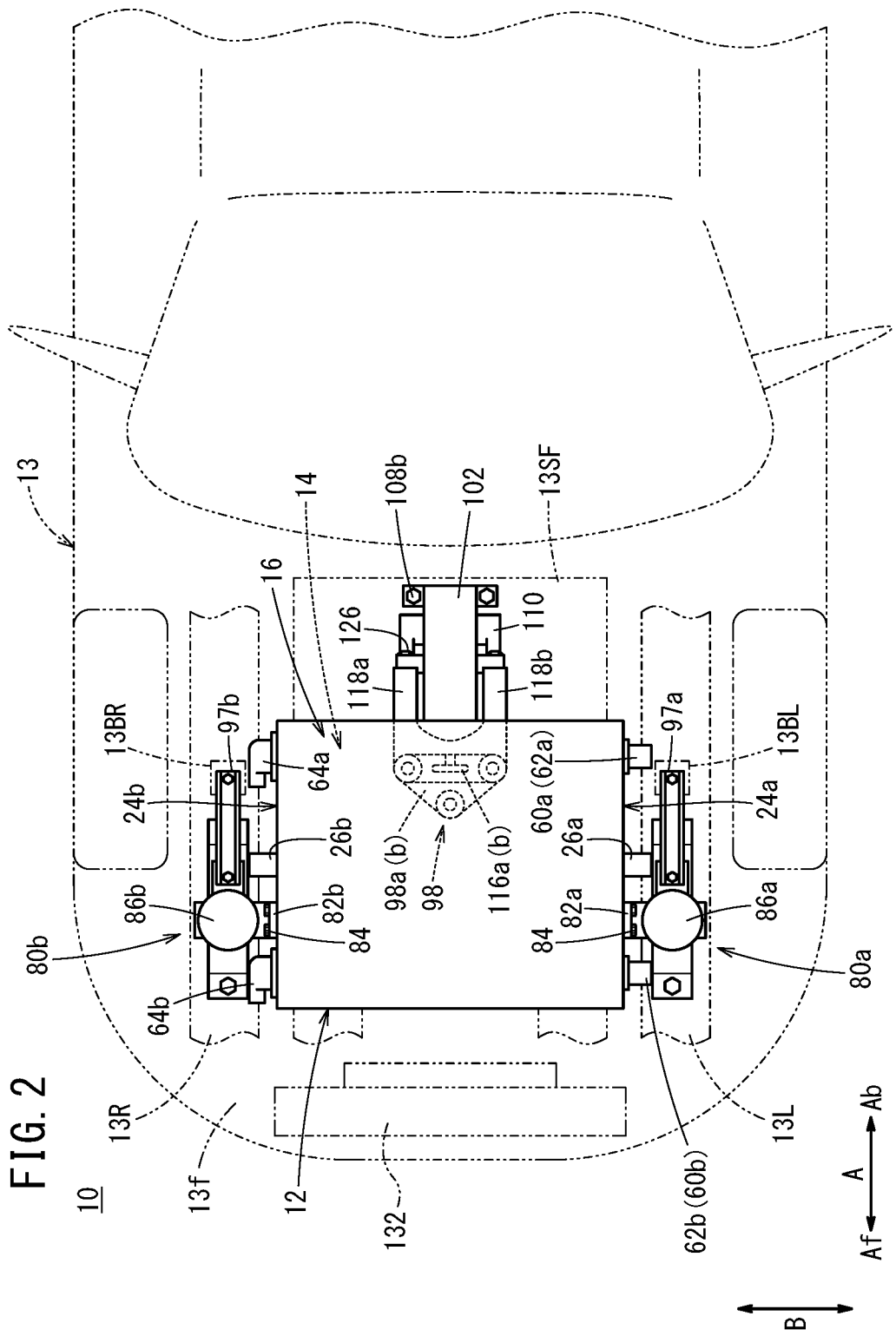
FIG. 2 is a plan view schematically showing the fuel cell electric vehicle.

As shown in FIGS. 1 and 2, a fuel cell stack 12 to which a mount structure 10 according to an embodiment of the present invention is applied is mounted in a motor room (front box) 13f at a front portion of a fuel cell electric vehicle (fuel cell vehicle) 13. The motor room 13f is isolated from a vehicle compartment 13ca by a partition wall member (dashboard) 13W (see FIG. 1).

Figure 3:
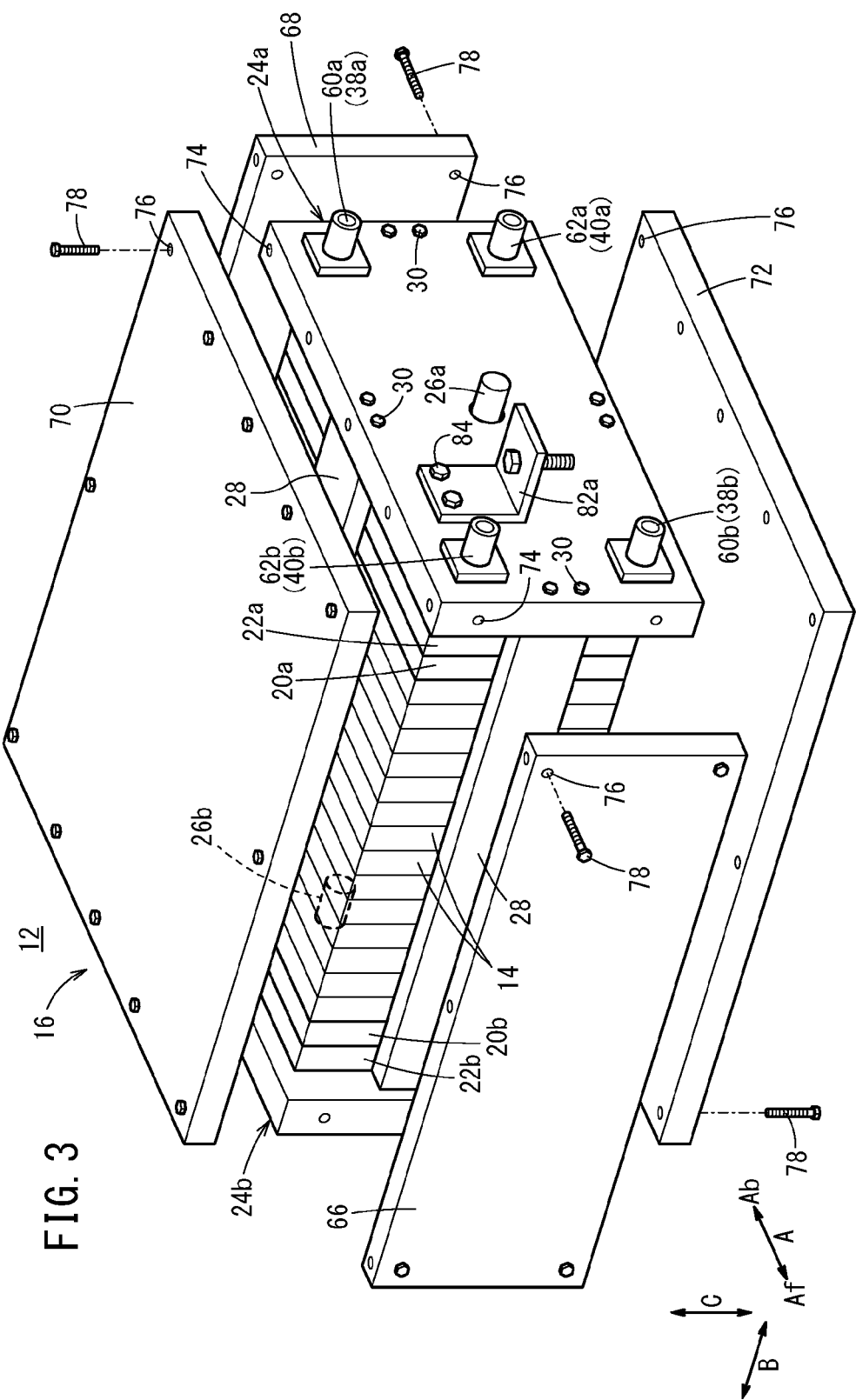
FIG. 3 is a partial exploded perspective view showing a portion of a stack case containing the fuel cell stack.

As shown in FIGS. 2 and 3, the fuel cell stack 12 includes a plurality of stacked power generation cells 14, and a stack case 16 containing the stacked power generation cells 14. As shown in FIG. 3, electrode surfaces of the power generation cells 14 are oriented upright, and the power generation cells 14 are stacked in a vehicle widthwise direction of the fuel cell electric vehicle 13 as indicated by the arrow B, which intersects with a vehicle lengthwise direction (traveling direction) as indicated by the arrow A.

As shown in FIGS. 1 and 2, in the motor room 13f, first vehicle frames (e.g., side frames) 13R, 13L, which make up parts of a vehicle body frame, extend in the direction of the arrow A. The fuel cell stack 12 is mounted on the first vehicle frames 13R, 13L and a second vehicle frame 13SF to be described later.

As shown in FIG. 3, a first terminal plate 20a is provided at one end in the stacking direction of the power generation cells 14. A first insulating plate 22a is provided outside of the first terminal plate 20a, and a first end plate 24a is provided outside of the first insulating plate 22a. A second terminal plate 20b is provided at the other end in the stacking direction of the power generation cells 14. A second insulating plate 22b is provided outside of the second terminal plate 20b, and a second end plate 24b is provided outside of the second insulating plate 22b.

A first power output terminal 26a extends outwardly from a substantially central position (or a position deviated from the central position) of the laterally elongated (rectangular) first end plate 24a. The first power output terminal 26a is connected to the first terminal plate 20a. A second power output terminal 26b extends outwardly from a substantially central position of the laterally elongated (rectangular) second end plate 24b. The second power output terminal 26b is connected to the second terminal plate 20b.

Coupling bars 28 each having a fixed length are provided between central positions of respective sides of the first end plate 24a and the second end plate 24b. Both ends of the coupling bars 28 are fixed by screws 30 to the first end plate 24a and the second end plate 24b, so as to apply a tightening load to the stacked power generation cells 14 in the stacking direction as indicated by the arrow B.

Figure 4:
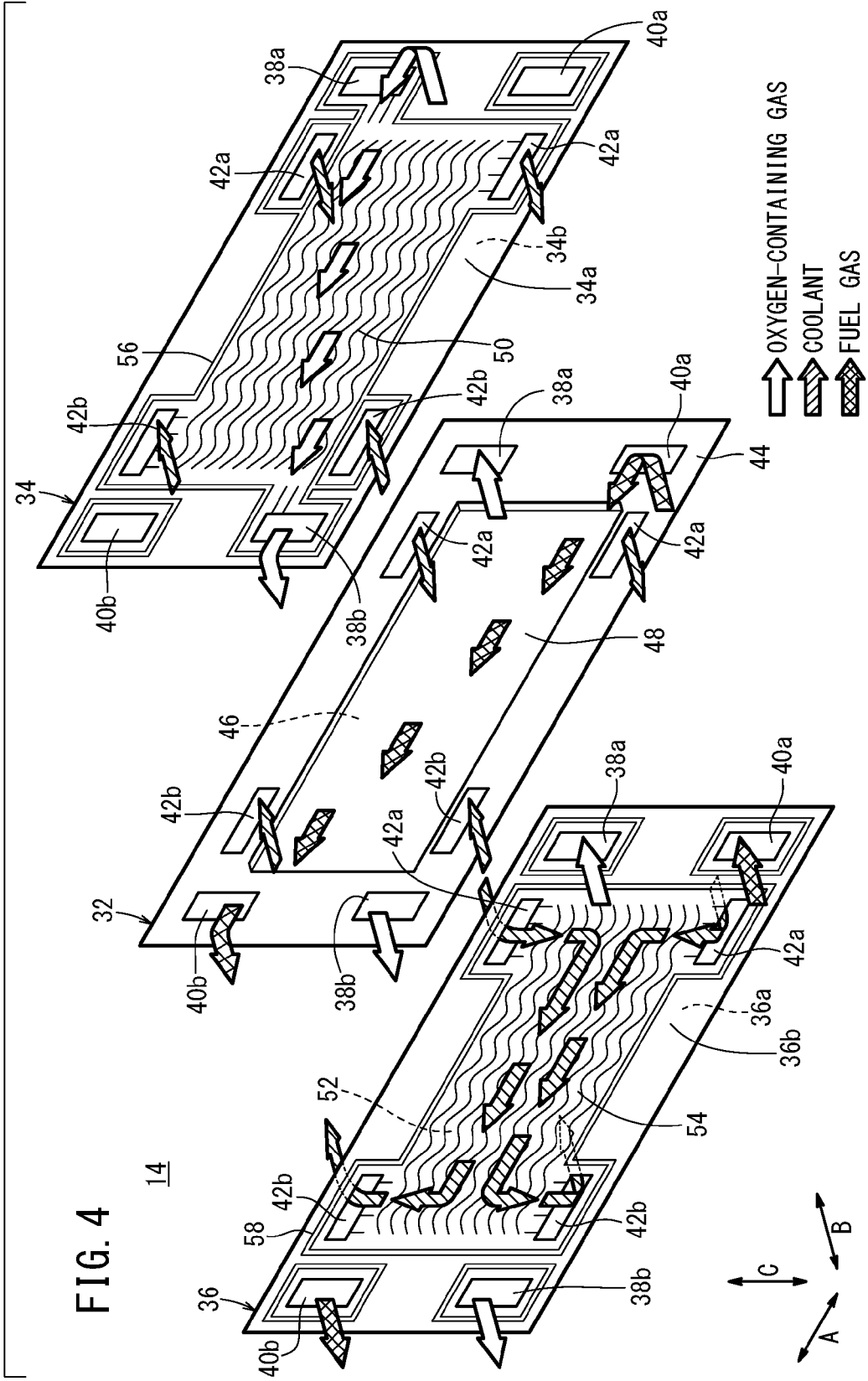
FIG. 4 is an exploded perspective view showing a power generation cell of the fuel cell stack.

As shown in FIG. 4, the power generation cell 14 includes a membrane electrode assembly 32, together with a cathode separator 34 and an anode separator 36 which sandwich the membrane electrode assembly 32 therebetween. For example, the cathode separator 34 and the anode separator 36 are metal plates such as steel plates, stainless steel plates, aluminum plates, plated steel sheets, or metal plates having anti-corrosive surfaces formed by a surface treatment. Each of the cathode separator 34 and the anode separator 36 include rectangular planar surfaces, and are formed by corrugating metal thin plates by press forming, so as to have a corrugated shape as viewed in cross section, and a wavy shape on the surface thereof. Carbon separators may be used, for example, instead of the cathode separator 34 and the anode separator 36.

The cathode separator 34 and the anode separator 36 have a laterally elongated shape including long sides that extend in a horizontal direction as indicated by the arrow A, and short sides that extend in the direction of gravity as indicated by the arrow C. Alternatively, the short sides may extend in the horizontal direction, and the long sides may extend in the direction of gravity.

An oxygen-containing gas supply passage 38a and a fuel gas supply passage 40a are provided at one end of the power generation cells 14 in a longitudinal direction as indicated by the arrow A. The oxygen-containing gas supply passage 38a and the fuel gas supply passage 40a extend through the power generation cells 14 in the direction of the arrow B.

An oxygen-containing gas, for example, is supplied to the power generation cells 14 through the oxygen-containing gas supply passage 38a, and a fuel gas such as a hydrogen-containing gas, for example, is supplied to the power generation cells 14 through the fuel gas supply passage 40a.

A fuel gas discharge passage 40b and an oxygen-containing gas discharge passage 38b are provided at the other end of the power generation cells 14 in the longitudinal direction. The fuel gas discharge passage 40b and the oxygen-containing gas discharge passage 38b extend through the power generation cells 14 in the direction of the arrow B. The fuel gas is discharged from the power generation cells 14 through the fuel gas discharge passage 40b, and the oxygen-containing gas is discharged from the power generation cells 14 through the oxygen-containing gas discharge passage 38b.

At both of opposite marginal portions of the power generation cell 14 in the lateral direction as indicated by the arrow C (on one end side in a horizontal direction), two coolant supply passages 42a for supplying a coolant are provided on one side, i.e., a side adjacent to the oxygen-containing gas supply passage 38a and the fuel gas supply passage 40a. The two coolant supply passages 42a extend through the power generation cells 14 in the direction of the arrow B for supplying the coolant. The coolant supply passages 42a are provided on upper and lower opposite sides.

At both of opposite marginal portions of the power generation cell 14 in the lateral direction (on another end side in the horizontal direction), two coolant discharge passages 42b for discharging the coolant are provided on the other side, i.e., a side adjacent to the fuel gas discharge passage 40b and the oxygen-containing gas discharge passage 38b. The two coolant discharge passages 42b extend through the power generation cells 14 in the direction of the arrow B for discharging the coolant. The coolant discharge passages 42b are provided on upper and lower opposite sides.

The membrane electrode assembly 32 includes a cathode 46 and an anode 48, and a solid polymer electrolyte membrane 44 interposed between the cathode 46 and the anode 48. The solid polymer electrolyte membrane 44 is a thin membrane of perfluorosulfonic acid containing water, for example.

Each of the cathode 46 and the anode 48 has a gas diffusion layer (not shown) such as carbon paper, and an electrode catalyst layer (not shown) of platinum alloy supported on porous carbon particles. The carbon particles are deposited uniformly on the surface of the gas diffusion layer. The electrode catalyst layer of the cathode 46 and the electrode catalyst layer of the anode 48 are fixed to both surfaces of the solid polymer electrolyte membrane 44, respectively.

The cathode separator 34 has an oxygen-containing gas flow field 50 on a surface 34a thereof facing toward the membrane electrode assembly 32. The oxygen-containing gas flow field 50 is connected to the oxygen-containing gas supply passage 38a and the oxygen-containing gas discharge passage 38b. The oxygen-containing gas flow field 50 includes a plurality of wavy flow grooves (or straight flow grooves) that extend in the direction of the arrow A.

The anode separator 36 has a fuel gas flow field 52 on a surface 36a thereof facing toward the membrane electrode assembly 32. The fuel gas flow field 52 is connected to the fuel gas supply passage 40a and the fuel gas discharge passage 40b. The fuel gas flow field 52 includes a plurality of wavy flow grooves (or straight flow grooves) that extend in the direction of the arrow A.

A coolant flow field 54 is formed between the mutually adjacent anode separator 36 and the cathode separator 34, i.e., between a surface 36b of the anode separator 36 and a surface 34b of the cathode separator 34. The coolant flow field 54 is connected to the coolant supply passages 42a and the coolant discharge passages 42b. The coolant flow field 54 extends in a horizontal direction, and in the coolant flow field 54, the coolant flows over the electrode area of the membrane electrode assembly 32.

A first seal member 56 is formed integrally with the surfaces 34a, 34b of the cathode separator 34 and around an outer end of the cathode separator 34. A second seal member 58 is formed integrally with the surfaces 36a, 36b of the anode separator 36 and around an outer end of the anode separator 36.

Each of the first seal member 56 and the second seal member 58 is made of a seal material, a cushion material, or a packing material such as EPDM (Ethylene Propylene Diene Monomer) rubber, NBR (nitrile butadiene rubber), fluoro rubber, silicone rubber, fluorosilicone rubber, butyl rubber, natural rubber, styrene rubber, chloroprene rubber, or acrylic rubber.

As shown in FIG. 3, an oxygen-containing gas supply manifold member 60a, an oxygen-containing gas discharge manifold member 60b, a fuel gas supply manifold member 62a, and a fuel gas discharge manifold member 62b, all of which are made of resin, are connected to the first end plate 24a. The oxygen-containing gas supply manifold member 60a is connected to the oxygen-containing gas supply passage 38a, the oxygen-containing gas discharge manifold member 60b is connected to the oxygen-containing gas discharge passage 38b, the fuel gas supply manifold member 62a is connected to the fuel gas supply passage 40a, and the fuel gas discharge manifold member 62b is connected to the fuel gas discharge passage 40b.

As shown in FIG. 2, a coolant supply manifold member 64a and a coolant discharge manifold member 64b, both of which are made of resin, are attached to the second end plate 24b. The coolant supply manifold member 64a is connected to the pair of coolant supply passages 42a, and the coolant discharge manifold member 64b is connected to the pair of coolant discharge passages 42b.

As shown in FIG. 3, the first end plate 24a and the second end plate 24b are provided at two sides (surfaces) at both ends of the stack case 16 in the vehicle widthwise direction as indicated by the arrow B. Further, a front side panel 66 and a rear side panel 68 are provided at two sides (surfaces) at both ends of the stack case 16 in the vehicle lengthwise direction as indicated by the arrow A. The front side panel 66 and the rear side panel 68 are shaped in the form of laterally elongated plates. An upper side panel 70 and a lower side panel 72 are provided at two sides (surfaces) at both ends of the stack case 16 in the vehicle height direction as indicated by the arrow C. The upper side panel 70 and the lower side panel 72 are shaped in the form of laterally elongated plates.

The front side panel 66, the rear side panel 68, the upper side panel 70, and the lower side panel 72 are fixed to the first end plate 24a and the second end plate 24b using screws 78 that are screwed through respective holes 76 into screw holes 74 formed on sides of the first end plate 24a and the second end plate 24b. It should be noted that the stack case 16 need not necessarily include the first end plate 24a and the second end plate 24b, and the entire fuel cell stack 12 may be covered by a housing.

As shown in FIGS. 1 and 2, the mount structure 10 includes side mounts 80a, 80b that support the fuel cell stack 12. The side mounts 80a, 80b are fixed to the first vehicle frames 13L, 13R. The side mount 80a includes a plate member 82a which is bent with an L-shape in cross section. The plate member 82a is fixed to the front side of the first end plate 24a in the direction of the arrow Af using a plurality of screws 84.

Figure 5:
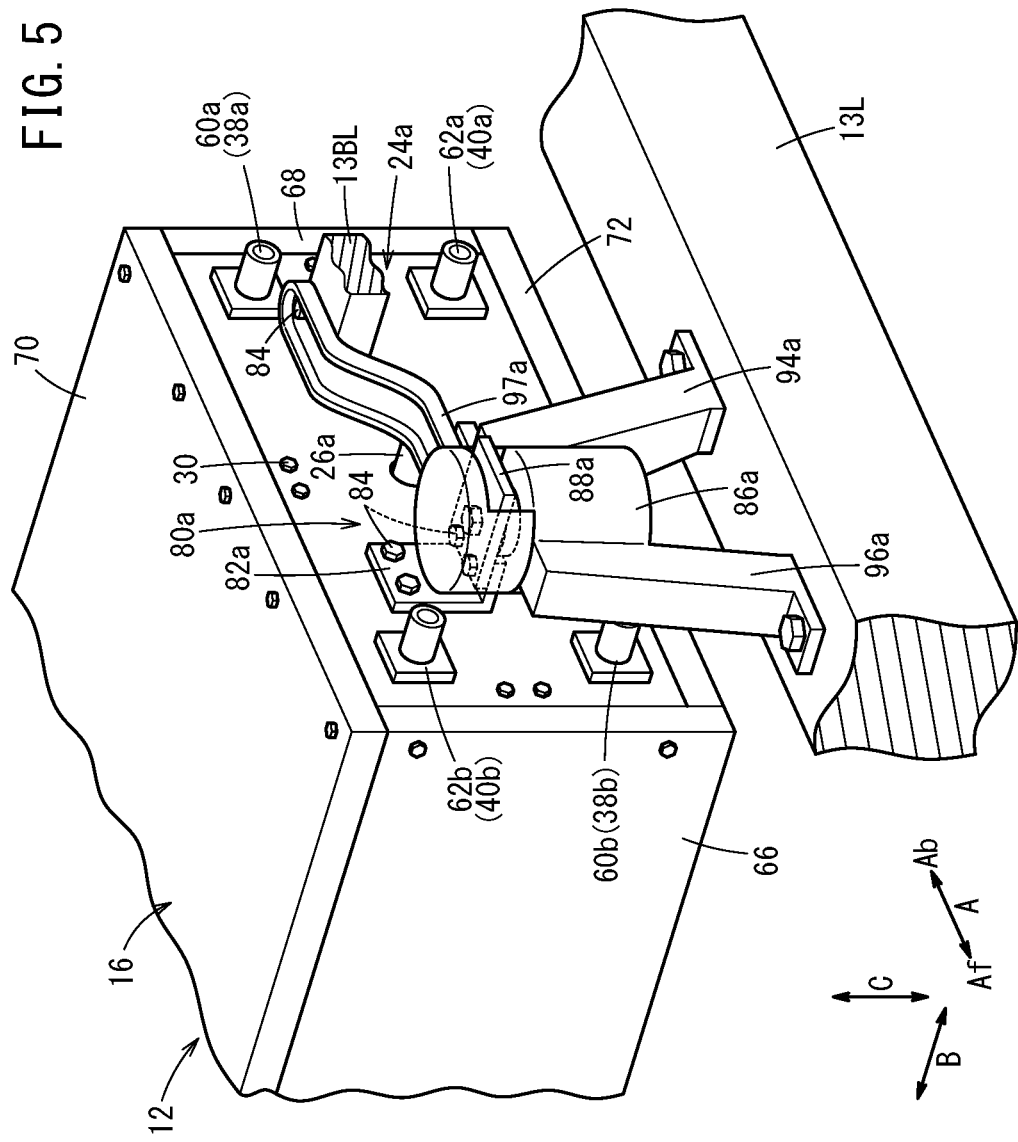
FIG. 5 is a perspective view showing a side mount of the mount structure.

As shown in FIG. 5, the side mount 80a includes a cushion (liquid seal mount) 86a, which is fixed to one end of the fuel cell stack 12 in the vehicle widthwise direction using the plate member 82a. A coupling plate 88a of the cushion 86a is fixed to the plate member 82a using screws 84.

The cushion 86a has two or more, e.g., two, attachment sections 94a, 96a, which serve to attach the cushion 86a to the first vehicle frame 13L. The attachment sections 94a, 96a have different lengths. For example, the attachment section 94a is longer than the attachment section 96a.

Using screws 84, one end of a bracket 97a is fixed to the side mount 80a at a position above the cushion 86a. The bracket 97a comprises an elongated plate having a bent portion. The other end of the bracket 97a is fixed to a vehicle body 13BL using screws 84.

As shown in FIG. 2, the side mount 80b has the same structure as the side mount 80a. Constituent elements of the side mount 80b, which are identical to those of the side mount 80a, are denoted by the same reference numerals (with a suffix b instead of the suffix a), and detailed description of such features is omitted. The side mount 80b is fixed to the first vehicle frame 13R using screws, and a bracket 97b is fixed to the vehicle body 13BR.

As shown in FIG. 1, the mount structure 10 includes the second vehicle frame (e.g., a cross member) 13SF provided below the fuel cell stack 12. A bracket member 98 is fixed to the second vehicle frame 13SF through a mount member 102, to be described later (see FIG. 2). A traction motor 100 is provided vertically under the fuel cell stack 12. The traction motor 100 is driven by electrical energy which is generated by the fuel cell stack 12. The front side of the traction motor 100 is fixed through a motor bracket 101 to the second vehicle frame 13SF using screws (see FIG. 1).

The mount structure 10 includes the mount member 102 for fixing the rear side of the traction motor 100 to the second vehicle frame 13SF. The mount member 102 includes a motor fixing section 106. Attachment sections 108a, 108b are provided below the motor fixing section 106. The attachment sections 108a, 108b are fixed to the second vehicle frame 13SF using screws. The attachment sections 108a, 108b have different lengths, respectively. A bracket 110, which is attached to the traction motor 100, is fixed to the motor fixing section 106 using screws.

Figure 6:
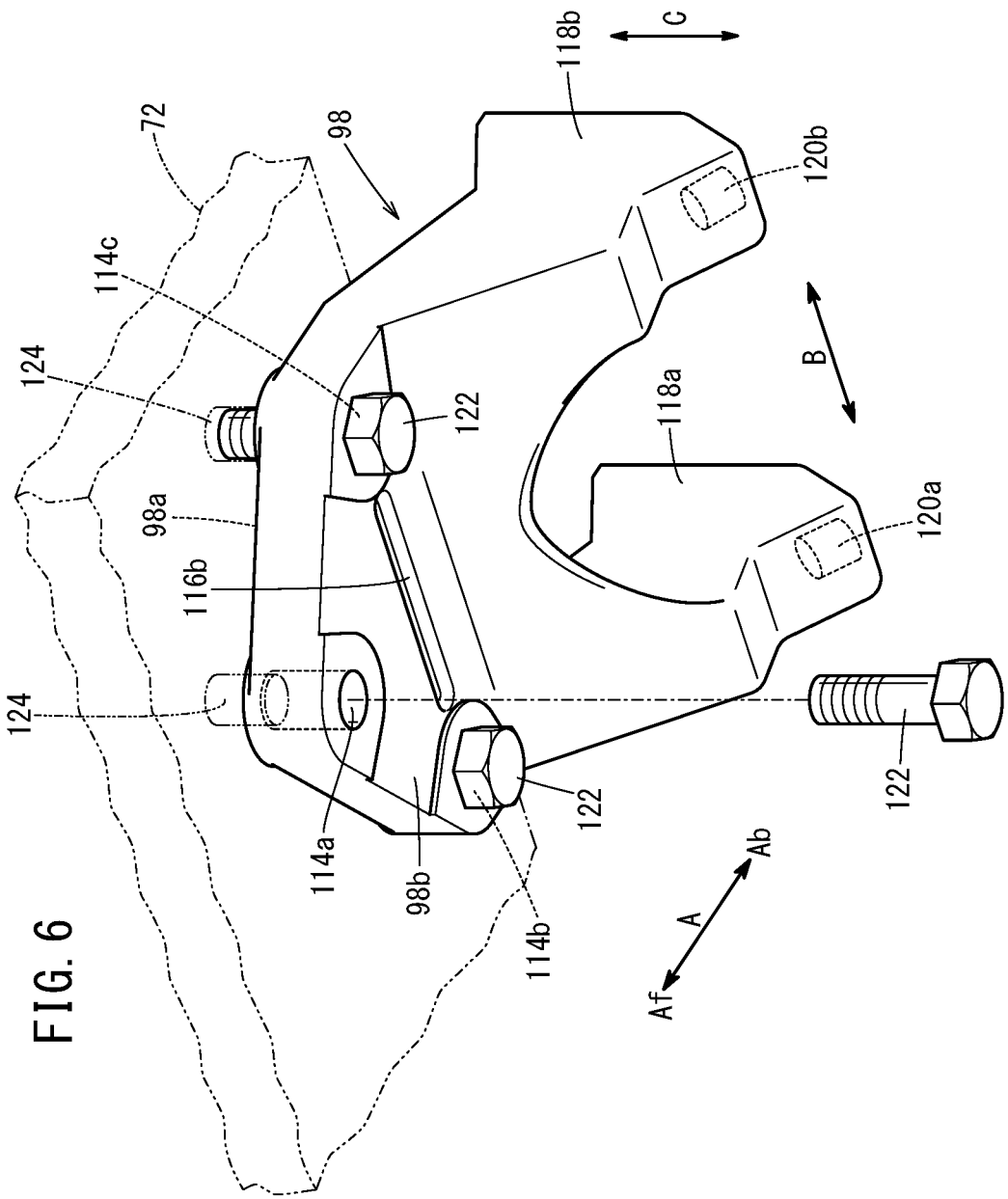
FIG. 6 is a perspective view showing a bracket member of the mount structure.
Figure 7:
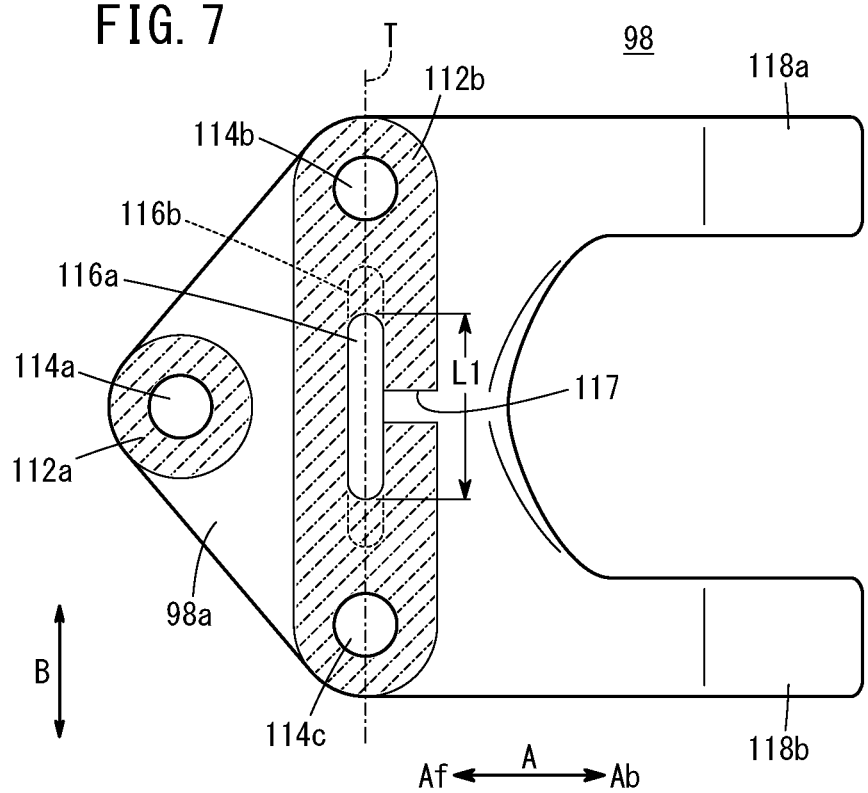
FIG. 7 is a plan view showing the bracket member as viewed from above.

The bracket member 98 is fixed to an upper part of the mount member 102 using screws. As shown in FIGS. 6 and 7, an upper surface 98a of the bracket member 98 is coupled to the bottom of the fuel cell stack 12, and more specifically, to a lower surface at an end of the lower side panel 72 in the direction of the arrow Af, and at a substantially central position in the direction of the arrow B. The upper surface 98a includes seat surfaces (flat surfaces) 112a, 112b thereon.

The seat surface 112a has a circular shape, and a hole 114a is formed in the center of the seat surface 112a. The seat surface 112b is spaced backward from the seat surface 112a in the direction of the arrow Ab, and has a substantially rectangular elongated shape in the direction of the arrow B. Holes 114b, 114c are formed at both ends of the seat surface 112b in the direction of the arrow B. The holes 114b, 114c are positioned on the back side of the hole 114a. Among the holes 114a, 114b, and 114c, which serve as bolt insertion holes, the holes 114b, 114c are positioned on a rearmost end in the vehicle traveling direction.

The seat surface 112b includes an upper surface cut 116a formed by cutting the bracket member 98 in a depth direction. The upper surface cut 116a extends in a surface direction of the upper surface 98a. The upper surface cut 116a is positioned between the holes 114b, 114c. The upper surface cut 116a and the holes 114b, 114c are arranged on the same virtual straight line T, which extends in the vehicle widthwise direction as indicated by the arrow B, connecting the centers of the holes 114b, 114c. The depth of the upper surface cut 116a is about 1 mm, and the length thereof is set to L1. A cutout 117 is formed at a substantially central position in the longitudinal direction of the seat surface 112b. The cutout 117 is connected to the upper surface cut 116a. The cutout 117 and the upper surface cut 116a have substantially the same depth. The cutout 117 is opened to the exterior.

Figure 8:
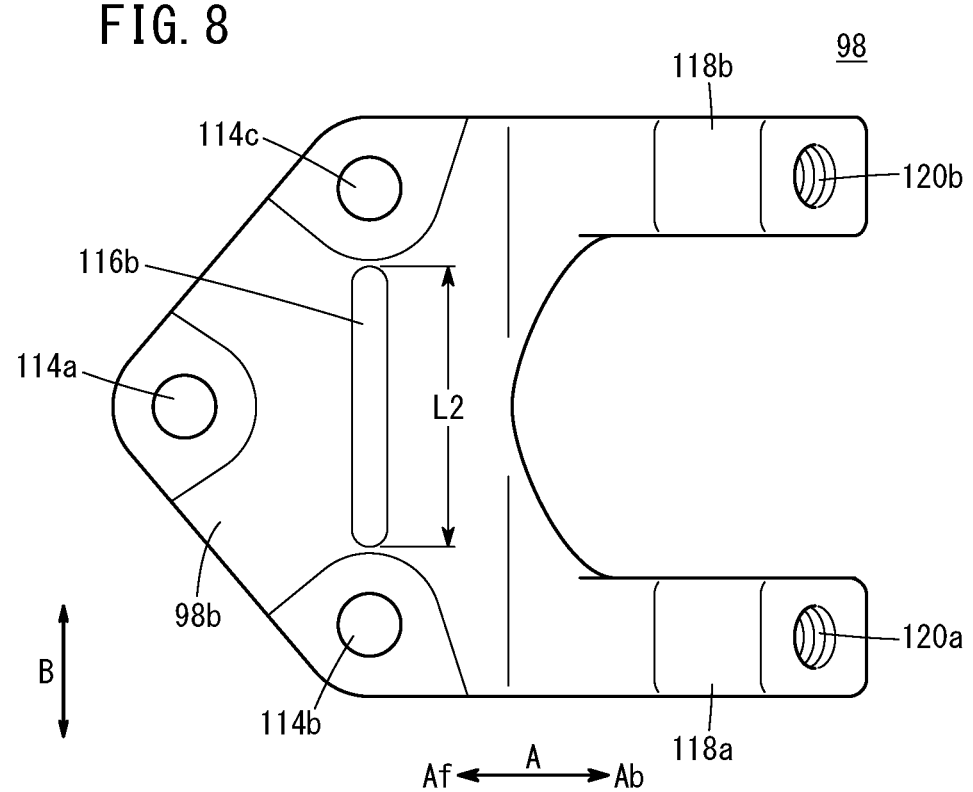
FIG. 8 is a plan view showing the bracket member as viewed from below.

As shown in FIGS. 6 and 8, a lower surface 98b (a surface opposite to the upper surface 98a) of the bracket member 98 includes a lower surface cut 116b therein. The lower surface cut 116b is formed by cutting the bracket member 98 in a depth direction. The lower surface cut 116b extends in a surface direction of the lower surface 98b. The lower surface cut 116b is positioned between the holes 114b, 114c. The lower surface cut 116b and the holes 114b, 114c are arranged on a virtual straight line T. The depth of the lower surface cut 116b is about 5 mm, and the length thereof is set to L2. The length L1 of the upper surface cut 116a is smaller than the length L2 of the lower surface cut 116b (L1<L2) (see FIG. 7).

As shown in FIGS. 6 to 8, a pair of support portions 118a, 118b extend downwardly from the upper surface 98a of the bracket member 98. Screw holes 120a, 120b are formed at ends of the support portions 118a, 118b.

As shown in FIGS. 1 and 6, bolts 122 are inserted into the holes 114a, 114b, and 114c, respectively. As shown in FIG. 6, the bolts 122 are screwed into screw holes 124 formed in the lower side panel 72, respectively, in order to fix the bracket member 98 to the lower surface of the lower side panel 72. As shown in FIG. 1, bolts 126 are screwed into the screw holes 120a, 120b of the support portions 118a, 118b in order to fix the bracket member 98 to the mount member 102.

As shown in FIG. 1, the first vehicle frames 13L, 13R have respective shock absorbers 128a, 128b. The strength of the shock absorbers 128a, 128b is low in comparison with other portions. For example, the shock absorbers 128a, 128b are in the form of thin frame members. The shock absorbers 128a, 128b are provided on the front side of the side mounts 80a, 80b in the vehicle traveling direction.

A thin shock absorber 130 is provided in the middle of the second vehicle frame 13SF. A fuel cell cooling radiator 132 is provided at the front end of the second vehicle frame 13SF, and the fuel cell stack 12 is disposed adjacent to a back portion of the radiator 132.

Hereinafter, operations of the fuel cell stack 12 in the fuel cell electric vehicle 13, which is constructed in the foregoing manner, will be described below.

First, as shown in FIG. 3, an oxygen-containing gas is supplied from the oxygen-containing gas supply manifold member 60a at the first end plate 24a to the oxygen-containing gas supply passage 38a. A fuel gas such as a hydrogen-containing gas is supplied from the fuel gas supply manifold member 62a at the first end plate 24a to the fuel gas supply passage 40a.

Further, as shown in FIG. 2, a coolant such as pure water, ethylene glycol, or oil is supplied from the coolant supply manifold member 64a at the second end plate 24b to the pair of coolant supply passages 42a.

Thus, as shown in FIG. 4, the oxygen-containing gas flows from the oxygen-containing gas supply passage 38a into the oxygen-containing gas flow field 50 of the cathode separator 34. The oxygen-containing gas flows along the oxygen-containing gas flow field 50 in the direction of the arrow A, and the oxygen-containing gas is supplied to the cathode 46 of the membrane electrode assembly 32, thereby inducing an electrochemical reaction at the cathode 46.

Meanwhile, the fuel gas is supplied from the fuel gas supply passage 40a to the fuel gas flow field 52 of the anode separator 36. The fuel gas moves along the fuel gas flow field 52 in the direction of the arrow A, and the fuel gas is supplied to the anode 48 of the membrane electrode assembly 32, thereby inducing an electrochemical reaction at the anode 48.

Thus, in the membrane electrode assembly 32, the oxygen-containing gas, which is supplied to the cathode 46, and the fuel gas, which is supplied to the anode 48, are partially consumed in the electrochemical reactions at the catalyst layers of the cathode 46 and the anode 48, thereby generating electricity.

Then, the oxygen-containing gas, which is partially consumed at the cathode 46 of the membrane electrode assembly 32, is discharged along the oxygen-containing gas discharge passage 38b in the direction of the arrow B. Meanwhile, the fuel gas, which is partially consumed at the anode 48 of the membrane electrode assembly 32, is discharged along the fuel gas discharge passage 40b in the direction of the arrow B.

Further, the coolant supplied to the pair of coolant supply passages 42a flows into the coolant flow field 54 between the cathode separator 34 and the anode separator 36. The coolant temporarily flows inwardly in the direction of the arrow C, and thereafter, the coolant moves in the direction of the arrow A, thereby cooling the membrane electrode assembly 32. After the coolant has moved outwardly in the direction of the arrow C, the coolant is discharged along the pair of coolant discharge passages 42b in the direction of the arrow B.

Electrical energy from the fuel cell stack 12, which is operated in the manner described above, is supplied to the traction motor 100 for allowing the fuel cell electric vehicle 13 to travel. At this time, as shown in FIG. 1, when an external load F is applied from the front side to the fuel cell electric vehicle 13, and the load F is applied backward in the vehicle lengthwise direction as indicated by the arrow Ab, the front portion of the fuel cell electric vehicle 13 tends to be deformed easily in an inward direction.

Thus, the radiator 132 moves backward in the direction of the arrow Ab and comes into contact with the fuel cell stack 12, and the load is applied in a backward direction to the fuel cell stack 12. In this regard, the mount structure 10 includes the side mounts 80a, 80b, which are fixed to the first vehicle frames 13L, 13R, and the bracket member 98, which is fixed to the second vehicle frame 13SF.

Therefore, when an external load F beyond a predetermined level is applied in a horizontal direction to the fuel cell stack 12, the first vehicle frames 13R, 13L are bent at the shock absorbers 128a, 128b, whereupon the side mounts 80a, 80b and the bracket member 98 are broken apart.

More specifically, in the side mount 80a, concentration of stress occurs in the shorter attachment section 96a, and the attachment section 96a is broken apart before the attachment section 94a, and thereafter, the attachment section 94a is broken apart. The side mount 80b is operated in the same manner as the side mount 80a. Meanwhile, in the second vehicle frame 13SF, bending starts from the shock absorber 130, whereupon the bracket member 98 is broken apart.

In the embodiment of the present invention, the bracket member 98 is provided, which connects the mount member 102 and the stack case 16 (fuel cell stack 12). The bracket member 98 is oriented in an upward direction as indicated by the arrow Af. Further, as shown in FIGS. 6 to 8, the upper surface 98a of the bracket member 98 has the upper surface cut 116a, and the lower surface 98b of the bracket member 98 has the lower surface cut 116b.

In the above structure, when an external load F is applied to the fuel cell electric vehicle 13, the bracket member 98 is broken apart reliably through the upper surface cut 116a and the lower surface cut 116b. Therefore, it is possible to suitably prevent damage from occurring to the fuel cell stack 12.

More specifically, since a tensile force is applied to the upper surface 98a of the bracket member 98, stresses are concentrated at the upper surface cut 116a to produce a crack. Such a crack spreads from both ends of the upper surface cut 116a in the longitudinal direction to the holes 114b, 114c, whereupon the bracket member 98 is broken apart. At this time, since the bolts 122 are screwed into the stack case 16, only the bracket member 98 need be removed.

In this regard, as shown in FIGS. 7 and 8, the lower surface 98b of the bracket member 98 includes the lower surface cut 116b therein, and the length L2 of the lower surface cut 116b is greater than the length L1 of the upper surface cut 116a. Further, the depth of the lower surface cut 116b is greater than the depth of the upper surface cut 116a.

A compression force is applied to the lower surface 98b of the bracket member 98. Therefore, by forming the lower surface cut 116b in the form of a long and deep groove, the bracket member 98 can be bent easily along the lower surface cut 116b.

Therefore, when an external load F is applied, the bracket member 98 can suitably be broken apart. Further, when the fuel cell stack 12 is provided with a slope, i.e., is inclined from the horizontal direction, the bracket member 98 can suitably maintain a bending stress that is applied from the fuel cell stack 12. Accordingly, with a simple and economical structure, it becomes possible to suitably and advantageously protect the fuel cell stack 12 against the external load F.

Further, the upper surface 98a of the bracket member 98 includes the seat surfaces 112a, 112b in the form of compact flat surfaces. Therefore, it is possible to concentrate stresses at the upper surface cut 116a. Further, the upper surface cut 116a and the holes 114b, 114c, which serve as bolt holes positioned at the rearmost end in the vehicle traveling direction, are arranged on the same virtual straight line T that extends in the vehicle widthwise direction. Therefore, the bracket member 98 can be configured to reliably produce a crack along the upper surface cut 116a.

Further, the cutout 117 is formed on the upper surface 98a of the bracket member 98. The cutout 117 is connected to the upper surface cut 116a, and the cutout 117 and the upper surface cut 116a have the same depth. In such a structure, it is possible to effectively prevent the formation of rust or the like due to stagnant water collecting in the upper surface cut 116a.

While the invention has been particularly shown and described with reference to a preferred embodiment, it will be understood that various modifications can be effected thereto by those skilled in the art without departing from the scope of the invention as set forth in the appended claims.

What is claimed is:

1. A mount structure for a fuel cell stack for a purpose of arranging the fuel cell stack, which comprises a plurality of stacked power generation cells for generating electrical energy by electrochemical reactions between a fuel gas and an oxygen-containing gas, in a motor room of a fuel cell vehicle,
    wherein a motor is disposed below the fuel cell stack;
    the mount structure comprising:
    a mount member configured to fix the fuel cell stack and the motor to a vehicle body; and
    a bracket member configured to connect the mount member and the fuel cell stack; and
    wherein an upper surface of the bracket member, which is connected to a lower portion of the fuel cell stack, has an upper surface cut formed by cutting the bracket member in a depth direction, and the upper surface cut extends in a surface direction of the upper surface; and
    a lower surface of the bracket member, which is opposite to the upper surface, has a lower surface cut formed by cutting the bracket member in the depth direction, and the lower surface cut extends in a surface direction of the lower surface.

2. The mount structure for the fuel cell stack according to claim 1, wherein a length of the upper surface cut in the surface direction is shorter than a length of the lower surface cut in the surface direction.

3. The mount structure for the fuel cell stack according to claim 2, wherein a cut depth of the upper surface cut is smaller than a cut depth of the lower surface cut.

4. The mount structure for the fuel cell stack according to claim 1, wherein a cut depth of the upper surface cut is smaller than a cut depth of the lower surface cut.

5. The mount structure for the fuel cell stack according to claim 1, further comprising a plurality of bolts configured to fix the bracket member and the fuel cell stack,
    wherein, among the bolts, a bolt positioned at a rearmost end in a vehicle traveling direction, the upper surface cut, and the lower surface cut are arranged on a same virtual straight line that extends in a vehicle widthwise direction.

6. The mount structure for the fuel cell stack according to claim 1, further comprising a stack case containing the fuel cell stack, wherein the bracket member is fixed to the mount member and a lower surface of the stack case.

\* \* \* \* \*